(12) United States Patent
Brombal et al.

(10) Patent No.: US 8,902,879 B2
(45) Date of Patent: Dec. 2, 2014

(54) GENERATING A COMFORT INDICATOR AT AN ORIGINATING TERMINAL

(75) Inventors: David S. Brombal, Plano, TX (US); Mark A. Stegall, Melissa, TX (US)

(73) Assignee: Rockstar Consortium US LP, Plano, TX (US)

( * ) Notice: Subject to any disclaimer, the term of this patent is extended or adjusted under 35 U.S.C. 154(b) by 2740 days.

(21) Appl. No.: 11/388,379

(22) Filed: Mar. 24, 2006

(65) Prior Publication Data

US 2006/0218286 A1 Sep. 28, 2006

Related U.S. Application Data

(60) Provisional application No. 60/664,866, filed on Mar. 24, 2005.

(51) Int. Cl.
H04L 12/66 (2006.01)
H04L 29/06 (2006.01)
H04M 7/12 (2006.01)

(52) U.S. Cl.
CPC ........ *H04L 65/1096* (2013.01); *H04L 65/1069* (2013.01); *H04M 7/129* (2013.01); *H04L 65/1006* (2013.01)
USPC ........................................................ 370/352

(58) Field of Classification Search
USPC ................................................. 370/352–356
See application file for complete search history.

(56) References Cited

U.S. PATENT DOCUMENTS

| 6,324,279 | B1 * | 11/2001 | Kalmanek et al. ............ 379/229 |
| 6,757,732 | B1 | 6/2004 | Sollee et al. |
| 6,934,279 | B1 | 8/2005 | Sollee et al. |
| 2004/0125965 | A1 * | 7/2004 | Alberth et al. .................. 381/77 |
| 2005/0018659 | A1 * | 1/2005 | Gallant et al. ................ 370/352 |

OTHER PUBLICATIONS

M. Handley, H. Schulzrinne, E. Schooler, and J. Rosenberg, SIP: Session Initiation Protocol, RRC 2543, Mar. 1999.*
S. Donovan, H. Schulzrinne, J. Rosenberg, M. Cannon, and A. Roach, SIP 183 Session Progress Message, IETF Internet Draft, Oct. 1999.*
3rd Generation Partnership Project 2 ("3GPP2"), "3GPP2 X.P0013-014 Proposed Baseline Text," Simplified IMS/MMD Call Flow Examples, pp. 1-14 (May 2005).
S. Donovan et al., Internet Engineering Task Force, Internet Draft, "SIP 183 Session Progress Message," pp. 1-24 (Apr. 2000).
J. Rosenberg et al., Network Working Group, RFC 3262, "Reliability of Provisional Responses in the Session Initiation Protocol (SIP)," pp. 1-14 (Jun. 2002).
J. Rosenberg et al., Network Working Group, RFC 3311, "The Session Initiation Protocol (SIP) Update Method," pp. 1-13 (Sep. 2002).
J. Rosenberg et al., Network Working Group, RFC 3261, "SIP: Session Initiation Protocol," pp. 1-269 (Jun. 2002).

* cited by examiner

*Primary Examiner* — Nicholas Jensen
(74) *Attorney, Agent, or Firm* — Saul Ewing LLP

(57) ABSTRACT

A call request is sent to establish a telephony session over an Internet Protocol (IP) network between an originating terminal and a destination device. A message responsive to the call request is received from a node connected to the IP network. In response to receiving the message, local generation of a comfort indicator at the originating terminal is performed.

19 Claims, 2 Drawing Sheets

GENERATING A COMFORT INDICATOR AT AN ORIGINATING TERMINAL

CROSS-REFERENCE TO RELATED APPLICATION

This claims the benefit under 35 U.S.C. §119(e) of U.S. Provisional Application Ser. No. 60/664,866, filed Mar. 24, 2005, which is hereby incorporated by reference.

TECHNICAL FIELD

The invention relates generally to locally generating a comfort indicator at an originating terminal.

BACKGROUND

Packet data networks, including wired networks and/or wireless networks, are used to link various types of network devices, such as personal computers, network telephones, mobile telephones, personal digital assistants (PDAs), and so forth. A widely used type of packet data network is the Internet Protocol (IP) network, in which data communications are performed using packets or datagrams.

With the increased capacity and reliability of packet data networks, voice communications (including telephone calls, video conferencing, and so forth) over such packet data networks have been implemented. Voice communications over packet data networks are unlike voice communications in a conventional circuit-switched network (such as a public switched telephone network), in which users are provided dedicated end-to-end circuit connections for the duration of each call. In a packet data network, voice data is carried in packets or datagrams that are sent in bursts from a source to one or more destination nodes. Voice data that is sent over a packet data network typically shares network bandwidth with conventional non-voice data, such as data associated with electronic mail, web access, file transfer, text chat sessions, and so forth.

Various standards have been proposed for establishing voice and multimedia communications over packet data networks. One example standard that defines control signaling used for establishing voice and multimedia communications is the Session Initiation Protocol (SIP), which defines messaging for establishing, controlling, and terminating multimedia sessions over a packet data network, such as an IP network. SIP is part of a multimedia data and control architecture developed by the Internet Engineering Task Force (IETF). In packet-switched wireless networks, the Third Generation Partnership Project (3GPP) and 3GPP2 have defined standards for SIP call flows. Other organizations have also defined SIP call flows for use in wired and/or wireless networks.

SIP is a text-based protocol that defines SIP messages having a text format, which tends to make SIP messages relatively large in size. As a result, the increased time involved in communicating SIP messages may cause call setup times to become longer. In addition to larger SIP message sizes, another cause of relatively long call setup times is that more SIP messages are involved in establishing a call session (particularly when extra messages are sent to provide reliability) than has been traditionally the case in circuit-switched networks.

As a result of a relatively long call setup time, there may be excessive delay between when a caller starts a call (such as by activating the "Send" button on a phone or completion of dialing digits) and when the caller receives an indication of ringing (ringback that indicates that the called party is being alerted). The interval between the time a caller starts a call and the time when ringback is received by the caller is referred to as post dial delay (PDD). Excessive PDD can cause user dissatisfaction. In some cases, a user may simply hang up if there is excessive PDD, since the user may incorrectly believe that the call has been dropped when in fact call establishment is proceeding in the packet data network among various nodes.

SUMMARY

In general, according to one embodiment, a method comprises sending a call request to establish a telephony session over an Internet Protocol (IP) network between an originating terminal and a destination device, and receiving a message responsive to the call request from a node connected to the IP network. In response to receiving the message, local generation of a comfort indicator at the originating terminal is performed.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
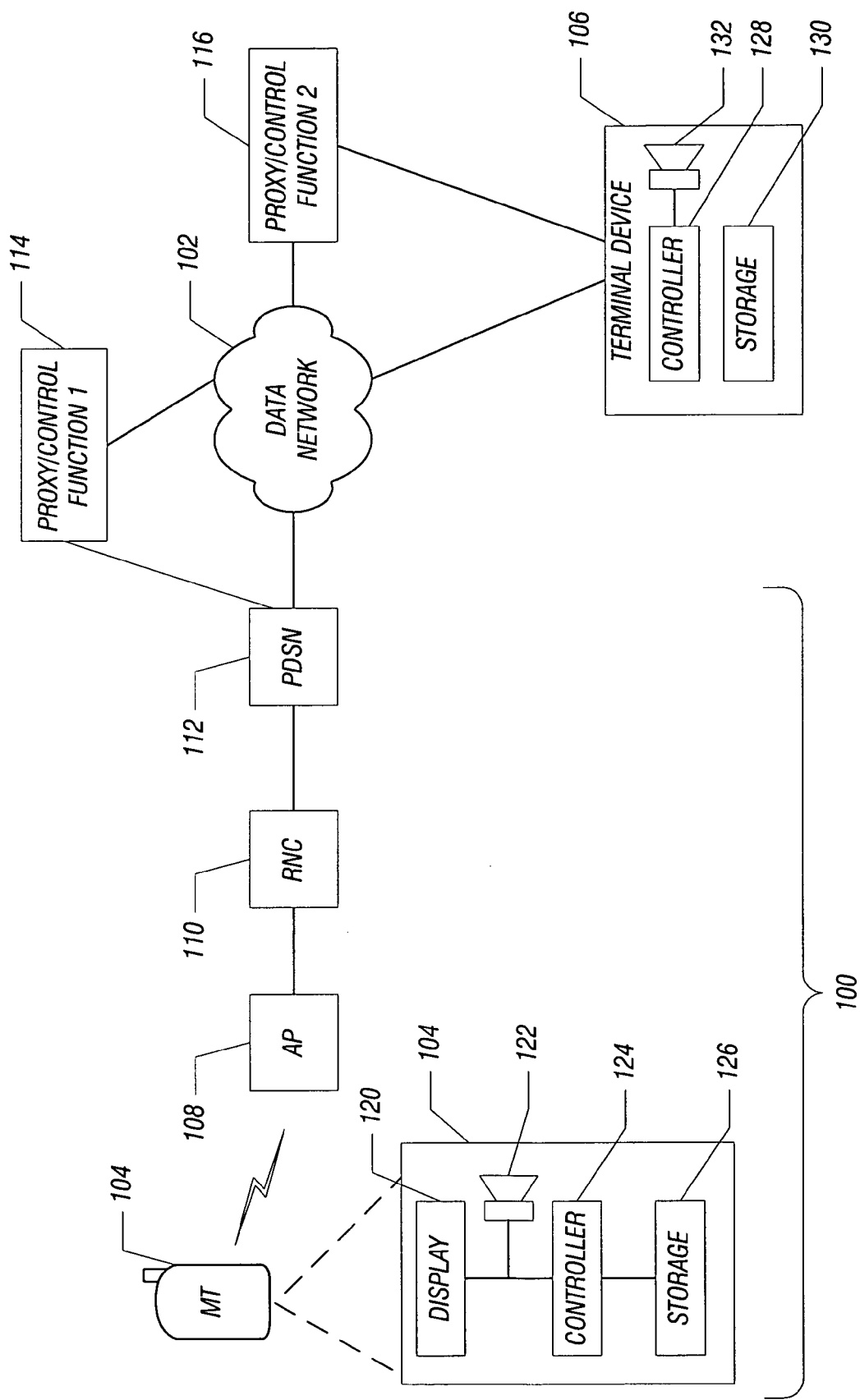
FIG. 1 is a block diagram of an example communications network that incorporates an embodiment of the invention.

FIG. 1 illustrates an example communications network that includes a wireless network 100 that is connected to a packet data network 102. Although reference is made to a "packet data network," it is to be understood that "packet data network" can actually refer to one or plural packet data networks that are coupled by one or more intermediate routers. For example, the packet data network 102 can actually include various different types of networks, such as local area networks (LANs), wide area networks (WANs), wireless local area networks (WLANs), and so forth. The wireless network 100 is a packet-switched wireless network in which packet-switched communications can be performed (e.g., packet-switched telephony, web browsing, electronic mail, file transfer, and so forth).

The wireless network 100 allows a mobile terminal 104 to communicate with network devices on the packet data network 102, such as a terminal device 106. The terminal device 106 can be an end user device (such as a network telephone, voice-enabled personal computer, or voice-enabled personal digital assistant), or alternatively, the terminal device 106 can be a media gateway that connects the packet data network 102 to a circuit-switched network such as the public switched telephone network (PSTN) or a circuit-switched wireless network. Instead of or in addition to the terminal device 106, a second packet-switched wireless network can be connected to the packet data network 102 such that the mobile terminal 104 in the wireless network 100 can communicate through the packet data network 102 to another mobile terminal in the second wireless network.

The arrangement of FIG. 1 is provided for purposes of example, since numerous other arrangements are possible in other embodiments. For example, the wireless network 100 can be omitted and replaced with a user device (such as a network telephone, a voice-enabled personal computer, or a voice-enabled personal digital assistant) that is able to establish a packet-switched telephony call session with the terminal device 106 (or other terminal devices).

In accordance with some embodiments, the mobile terminal 104 (or other user terminal) is able to establish a packet-switched telephony call session with the terminal device 106 (or with another terminal device on the packet data network 102). A packet-switched telephony call session refers to a communications session in which voice data (and possibly other real-time data such as video data) is exchanged between the two end terminals, where the voice data (and/or other real-time data) is encapsulated in packets that are communicated through the packet data network 102 and through various access networks (such as the wireless network 100).

An example protocol that provides for packet-switched communications is the Internet Protocol (IP). IPv4 (IP version 4) is defined in Request for Comments (RFC) 791, entitled "Internet Protocol," dated September 1981; and IPv6 (IP version 6) is described in RFC 2460, entitled "Internet Protocol, Version 6 (IPv6) Specification," dated December 1998. In the IP context, a packet-switched telephony call session is referred to as a "voice-over-IP call session" or "telephony-over-IP call session." A packet data network that communicates IP packets is referred to as an IP network.

Various standards exist that define control signaling to be used for establishing, controlling, and terminating packet-switched telephony call sessions between end devices coupled to the packet data network 102. One example standard is the Session Initiation Protocol (SIP). The base version of SIP is defined in RFC 3261, entitled "SIP: Session Initiation Protocol," dated June 2002. Extensions of SIP are defined in other documents, such as RFC 3262, entitled "Reliability of Provisional Responses in the Session Initiation Protocol (SIP)," dated June 2002; and RFC 3311, entitled "The Session Initiation Protocol (SIP) UPDATE Method," dated September 2002.

Other standards have also been proposed for defining control signaling for packet-switched telephony call sessions. One such other standard is the H.323 Recommendation from the International Telecommunications Union (ITU). Alternatively, proprietary signaling protocols can be used for establishing, controlling, and terminating packet-switched call sessions, including versions of SIP that include proprietary messages. In the context of the present application, reference to "SIP" refers to standard SIP, extensions of SIP, as well as any modified versions of SIP, whether proprietary or public.

SIP messages have a text format, which tends to make SIP messages relatively large in size. Also, to provide for enhanced reliability, there may be a relatively large number of SIP messages exchanged between an originating terminal and a destination device when establishing a packet-switched telephony call session. Consequently, in some cases, post dial delay associated with packet-switched telephony call session establishment can be quite large. The post dial delay is the interval of time between a caller starting a call session, such as by activating a "Send" button, completing the dialing of telephone number digits, or activating a control element in a graphical user interface (GUI), and the time when the originating terminal generates a ringback indicator. A ringback indicator refers to a ringing indication (or other indication) that indicates the destination device is being alerted or is in the process of being alerted. The destination device is "being alerted" when the destination device (or network infrastructure associated with the destination device) either (1) has provided the alert to the called party, or (2) is in the process of causing the alert to be generated, in response to a call request from the originating terminal.

In accordance with some embodiments, to enhance user experience and satisfaction and to avoid a user prematurely ending a call by hanging up when the user does not hear a ringback indicator for some post dial delay, a comfort indicator is provided at the originating terminal so that the caller is aware that call establishment is proceeding. The comfort indicator is generated locally at the originating terminal (1) after a call request has been transmitted by the originating terminal for establishing a packet-switched telephony call session, and (2) in response to receiving a message responsive to the call request from a node connected to the packet data network 102. In accordance with some embodiments, the comfort indicator can be an audio indicator, such as some predefined tone, chirp, voice announcement, and so forth. Alternatively, the comfort indicator can also be a visual indicator (which can be in place of the audio indicator or in addition to the audio indicator).

More generally, a "comfort indicator" refers to any type of indicator provided to a user at the originating terminal to indicate to the caller that call establishment is proceeding, where this comfort indicator is different from a ringback indicator that indicates that the destination device is being alerted in response to the call request. In other words, the comfort indicator is presented by the originating terminal during the time interval (corresponding to the post dial delay) between starting of the call session and receipt of a message that indicates that the destination terminal is being alerted. In accordance with some embodiments, the comfort indicator is generated "locally" at the originating terminal. Local generation of the comfort indicator means that the comfort indicator is originally generated by a component in the originating terminal, without any exchange of media or bearer data in a media or bearer path between the originating terminal and another terminal. Media or bearer data refers to actual traffic (audio and/or other real-time data) exchanged between nodes. A media or bearer path refers to a path through a network (e.g., packet data network 102 and/or wireless network 100) to communicate the media or bearer data. The terms "media" and "bearer" are used interchangeably in this discussion.

Not having to establish a media or bearer path with the originating terminal to provide the comfort indicator provides the benefit of not having to deal with the complexities of establishing a media or bearer path and switching that media or bearer path to a different media or bearer path once the call session has been successfully completed. Also, not having to establish a media or bearer path for presenting the comfort indicator reduces consumption of network resources, such as resources in the wireless network 100 and/or packet data network 102.

As further depicted in FIG. 1, the mobile terminal 104 performs wireless communications (e.g., radio frequency communications) with an access point (AP) 108. The access point 108 (sometimes referred to as a base transceiver station) is part of a cell segment (either a cell or a cell sector). The wireless network 100 includes multiple cell segments in which mobile terminals can communicate with respective access points over radio frequency (RF) links.

The access point 108 is coupled to a radio network controller (RNC) 110 (sometimes referred to as a base station controller or BSC). In some implementations, the wireless network 100 is a CDMA 2000 network, such as a 1xRTT network or a 1xEVDO or 1xEVDV network. Other types of networks, such as UMTS (Universal Mobile Telecommunications System) networks can also be employed in other implementations. The RNC 110 supports packet-switched communications in which packet data is communicated between the mobile terminal 104 and another endpoint. The RNC 110 is coupled to a packet data serving node (PDSN) 112. The RNC 110 supports packet data services through the PDSN 112, which in turn is connected to the packet data network 102. Call establishment using SIP in packet-switched wireless networks has been defined by 3GPP (for UMTS networks) and 3GPP2 (for CDMA 2000 networks).

FIG. 1 also depicts a first proxy/control function module 114. The first proxy/control function module 114 includes a proxy component that makes requests on behalf of a client, such as the mobile terminal 104 when the mobile terminal 104 is involved in establishing a packet-switched telephony call session (either as an originator or a destination). The control function aspect of the module 114 provides session control to enable clients such as the mobile terminal 104 to access services in a particular network. An example of the proxy/control function module 114 is the call session control function (CSCF) module that is part of the IP multimedia subsystem (IMS) architecture. Note that there can be several types of CSCF modules, including a proxy CSCF, an interrogating CSCF, and a serving CSCF. The proxy/control function module 114 can refer to any one of or some combination of these CSCFs. In other implementations, the proxy/control function module 114 can be other types of control modules involved in call establishment involving the mobile terminal 104.

FIG. 1 also depicts a second proxy/control function module 116 that is similar to the first proxy/control function module 114, except that the second proxy/control function module 116 is associated with the terminal device 106 (instead of with mobile terminal 104). In an example where the mobile terminal 104 is the originating terminal, and the terminal device 106 is the destination terminal, the first proxy/control function module 114 is considered the originating proxy/control function module, while the second proxy/control function module 116 is considered the destination proxy/control function module. More generally, the proxy/control function modules can be simply referred to as "call control function modules."

The mobile terminal 104 has a display 120 and an audio speaker 122 (as well as a microphone, not shown). In accordance with some embodiments, the audio speaker 122 is used for outputting an audio comfort indicator, while the display 120 can be used for displaying a visual comfort indicator. The display 120 and the audio speaker 122 are examples of an output device that is used to present the comfort indicator. The mobile terminal 104 also includes a controller 124 and a storage 126. The controller 124 is used for controlling various functions of the mobile terminal 104. The controller 124 can be implemented with various types of control devices, such as microcontrollers, microprocessors, digital signal processors, and so forth. The storage 126 is used for storing data and instruction code that can be executed on the controller 124.

The terminal device 106 similarly includes a controller 128 and a storage 130. If the terminal device 106 is an end user device, then the terminal device 106 also includes an audio speaker 132 for outputting audio signals, such as an alert signal (when a call is made to the terminal device). If the terminal device 106 is a media gateway (rather than an end user terminal), then the audio speaker 132 is not included in the terminal device 106, but rather the terminal device 106 provides some indication to a remote end user device to generate an alert.

Local generation of a comfort indicator at the mobile terminal 104 can be accomplished using one of several different techniques, in accordance with some embodiments. A first technique involves changing the interpretation of an existing message that is received by the mobile terminal 104 in response to a call request. In other words, the mobile terminal 104 is programmed to interpret an existing message as the trigger for locally generating the comfort indicator at the mobile terminal 104. The existing message is unmodified from a standard message (as defined by a protocol such as SIP).

According to a second technique, the content of an existing message can be modified to include one or more special fields (not defined by a protocol such as SIP) that are used to trigger local generation of the comfort indicator. The one or more special fields can include a flag to indicate to the mobile terminal 104 that local generation of the comfort indicator is to occur. Also, the one or more special fields of the message can be used to specify the type of comfort indicator (e.g., different types of audio tones or visual indicators) to use.

A third technique for causing generation of the comfort indicator is to define a new message that is sent by a node (such as one of the call control function modules 114 and 116) to indicate to the mobile terminal 104 that local generation of the comfort indicator is to be performed.

Although local generation of a comfort indicator at the mobile terminal 104 is described, it is noted that local generation of a comfort indicator according to some embodiments can be performed with other types of originating terminals, such as voice-enabled computers, voice-enabled PDAs, network telephones, and so forth.

Figure 2:
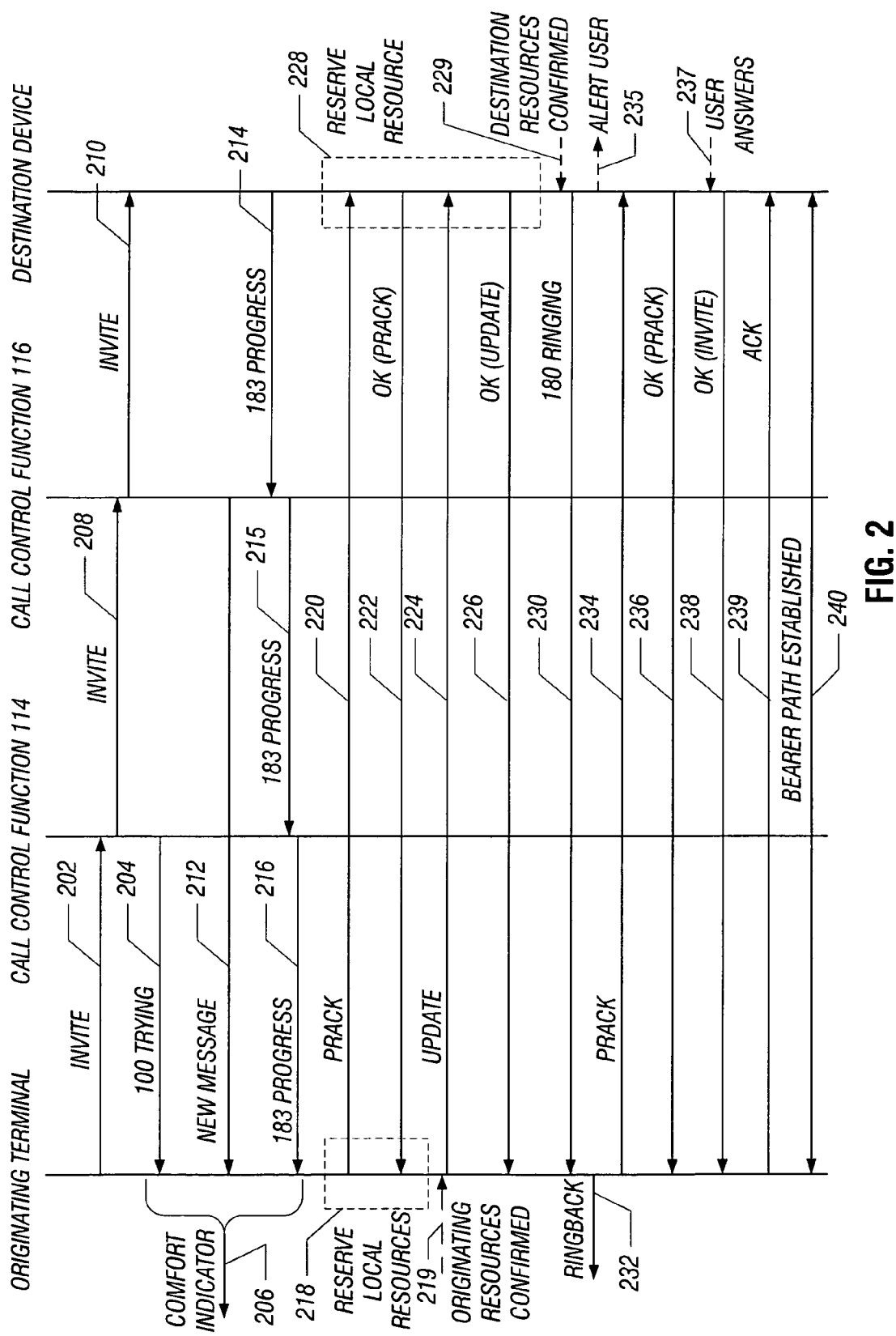
FIG. 2 is a message flow diagram of a process of establishing a call session in which a comfort indicator is provided to an originating terminal, in accordance with an embodiment.

FIG. 2 illustrates a flow diagram for establishing a packet-switched telephony call session according to some embodiments. The flow diagram of FIG. 2 involves the communication of SIP messages among various nodes, including an originating terminal (e.g., mobile terminal 104), a destination device (e.g., terminal device 106), and the call control function modules 114, 116. In a different scenario, one or both of the call control function modules 114, 116 can be omitted. Also note that various messages that are typically exchanged are omitted in FIG. 2 for the purpose of better clarity.

Reference is made herein to the originating terminal and destination device sending messages to or receiving messages from each other. Note that the terms "to" and "from" are used to indicate direct or indirect sending or receipt of messages between the originating terminal and destination device. For example, the originating terminal can send a message to the destination device either directly or indirectly through intermediate nodes such as modules 114 and 116.

To initiate the packet-switched telephony call session, the originating terminal transmits (at 202) a SIP Invite message to the originating call control function module 114. The Invite message is a call request to indicate that the destination device is being invited to participate in the call session. The message body of the Invite message contains a description (e.g., in SDP or Session Description Protocol format) of the session to which the destination device is being invited. If other protocols are used for call establishment, then other types of call requests are used.

The Invite message is sent by the originating terminal in response to user activation of some call control element at the originating terminal (such as a "Send" button, completion of dialing of digits corresponding to a called telephone number, activation of a graphical user interface (GUI) element indicating initiation of a call request, and so forth). There can be some amount of post dial delay between activation of this call control element and the provision of a ringback indicator to the originating terminal. During the post-dial-delay interval, in accordance with some embodiments, a comfort indicator is locally generated (at 206) at the originating terminal in response to a message from a node connected to the packet data network 102. The message can be one of several types of messages, such as those discussed above (unmodified existing message, modified existing message, or new message).

One example message is a SIP 100 Trying message sent (at 204) from the originating call control function module 114 to the originating terminal. The "Trying" message is sent from the call control function module 114 to the originating terminal in response to the Invite message sent at 202. The SIP 100 Trying message indicates that some unspecified action is being taken on behalf of this call request (Invite), but that the destination terminal has not yet been located. In response to the SIP Trying message, the originating terminal locally generates (at 206) the comfort indicator. The SIP 100 Trying message that is used for triggering the generation of the comfort indicator at 206 can be an unmodified SIP 100 Trying message or a modified SIP 100 Trying message that has one or more special fields relating to generation of the comfort indicator.

As further depicted in FIG. 2, upon receiving the Invite message at 202, the call control function module 114 sends (at 208) an Invite message to the destination call control function module 116, which in turn transmits (at 210) an Invite message to the destination device.

In accordance with an alternative embodiment, upon receiving the Invite message (at 208) from the originating call control function module 114, the destination call control function module 116 can send (at 212) a new message back to the originating terminal for the purpose of causing local generation (at 206) of the comfort indicator. This new message can either be defined outside of SIP or can be an extension of the current version of SIP. The new message sent from the destination call control function module 116 to the originating terminal can specify a flag to indicate that local generation of the comfort indicator is to be performed, and optionally, the new message can specify the type of comfort indicator to generate. The new message sent at 212 can replace the 100 Trying message as the message that triggers local generation of the comfort indicator at the originating terminal.

Alternatively, instead of using either the 100 Trying message (at 204) or the new message (at 212), another existing SIP message can be used for causing local generation of the comfort indicator at the originating terminal. One such alternative message is the SIP 183 Progress message. The 183 Progress message (a session progress message) is used to convey information about the progress of the call that is not otherwise classified. A 183 Progress message is sent (at 214) from the destination device to the destination call control function module 116, which in turn sends (at 215) a 183 Progress message to the originating call control function module 114. In response the 183 Progress message, the originating call control function module 114 sends (at 216) a 183 Progress message to the originating terminal. In response to the 183 Progress message, the originating terminal locally generates (at 206) the comfort indicator.

In other embodiments, other types of messages can be employed to trigger the local generation of the comfort indicator at 206 by the originating terminal. Note that the comfort indicator generated by the originating terminal is performed locally, and not based on establishment of a media or bearer path between the originating terminal and another node connected to the packet data network 102. By not having to establish a media or bearer path with the originating terminal over the packet data network 102 for providing the comfort indicator at 206, more efficient usage of the packet data network resources and wireless network resources is achieved and less complexity is involved.

The remaining portions of the message flow diagram depicted in FIG. 2 are provided to illustrate an example of why there can be a relatively large post dial delay between initiation of a call and receipt of a message to allow ringback to occur. Note that the exchange of messages performed in FIG. 2 is provided for purposes of example, as different call flows will use different combinations of messages.

In the example of FIG. 2, receipt of the 183 Progress message (at 216) is an indication to the originating terminal that reservation of local resources (at 218) can be started. Reservation of local resources refers to allocation of resources to enable the originating terminal to exchange bearer data over a bearer path. For example, in the context of the wireless network 100, the local resources reserved include RF resources and other wireless network-related resources. In a wired environment, reservation of wired network resources is performed. Other local resources that can be reserved include resources reserved based on activation of a packet data protocol (PDP) context (primary PDP context and/or secondary PDP context) and reservation of QoS (quality of service). Reservation of the local resources at 218 ensures that once call establishment has completed, the originating terminal has access to resources to enable the originating terminal to exchange bearer data.

In response to the 183 Progress message, the originating terminal sends (at 220) a Prack (Provisional acknowledgment) message to the destination device for reliability purposes. Although the Prack message at 220 is shown as being routed directly from the originating terminal to the destination device, it is noted that the Prack message actually is first sent from the original terminal to the originating call control function module 114, followed by the originating call control function module 114 sending a Prack message to the destination call control function module 116, and followed by the destination call control function module 116 sending a Prack message to the destination device. The remaining messages of FIG. 2 are similarly depicted as flowing directly between the originating terminal and destination device, when in actuality the messages are routed through the call control function modules 114, 116.

At the destination device, the Prack message can be used as an indication to start the reservation of local resources (at 228) at the destination device. Alternatively, reservation of local resources at the destination device can be started in response to the destination device sending (at 214) the 183 Progress message. The destination device acknowledges the Prack message by sending an OK message (at 222) back to the originating terminal.

Once reservation of local resources has been completed at the originating terminal (originating resources confirmed at 219), the originating terminal sends (at 224) a SIP Update message to the destination device. The SIP Update message allows a client (such as the originating terminal) to update parameters of a session (e.g., indicate that resource reservation has completed). In response to the Update message, the destination device sends (at 226) an OK message back to the originating terminal.

Once reservation of destination resources has been confirmed (at 229), the destination device sends a SIP 180 Ringing message (at 230) to the originating terminal. The Ringing message is an indication that the destination device is alerting (at 235) the called party.

In response to the Ringing message received at 230, the originating terminal generates (at 232) a ringback indicator. The originating terminal also sends (at 234) a Prack message to the destination device in response to the Ringing message received at 230. In response to Prack at 234, the destination device acknowledges the Prack message by sending a first OK message (at 236). Next, when the called party answers (at 237), the destination device acknowledges the Invite message by sending (at 238) an OK message to indicate that the call initiation based on the original Invite message has succeeded. The originating terminal responds by sending (at 239) a SIP ACK message. In response to the OK message at 238, a bearer path can be established (at 240) between the originating terminal and the destination device.

Note that there are a relatively large number of messages between when the Invite message was originally sent (at 202) and when the Ringing message is received (at 230). The interval between these two messages generally defines the post dial delay. Without the comfort indicator provided at 206 (which continues during the post dial delay until the ringback indicator is generated), a user may mistakenly believe that call establishment has failed and may hang up prior to receipt of the ringback indicator at 232.

In an alternative embodiment, instead of an originating terminal that is an end user device such as the mobile terminal 104, the originating terminal can instead be a media gateway coupled to the packet data network 102.

Instructions of various software modules (e.g., software modules executed in the mobile terminal 104 or terminal device 106 of FIG. 1 to perform the various tasks described herein) are loaded for execution on corresponding processors (e.g., controller 124 or 128 in FIG. 1). Processors include microprocessors, microcontrollers, processor modules or subsystems (including one or more microprocessors or microcontrollers), or other control or computing devices. As used here, a "control module" refers to hardware, software, or a combination thereof. A "control module" can refer to a single component or to plural components (whether software or hardware).

Data and instructions (of the software) are stored in respective storage devices (e.g., storage 126 or 130 in FIG. 1), which are implemented as one or more machine-readable or computer-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While some embodiments have been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method comprising:
    sending a call request to establish a telephony session over an Internet Protocol (IP) network between an originating terminal and a destination device;
    receiving a first message responsive to the call request from a node connected to the IP network; and
    in response to receiving the first message, causing local generation of a comfort indicator at the originating terminal, wherein causing local generation of the comfort indicator at the originating terminal is performed without exchanging any media data over any bearer path established over the IP network with the originating terminal, and wherein the comfort indicator is different from a ringback indicator that indicates that the destination device is being alerted.

2. The method of claim 1, wherein causing local generation of the comfort indicator comprises causing local generation of an audio comfort tone that is different from the ringback indicator.

3. The method of claim 2, further comprising causing generation of the ringback indicator at the originating terminal in response to receiving a second message indicating that the destination device is being alerted.

4. The method of claim 3, wherein generation of the comfort indicator occurs in a post dial delay time interval after sending of the call request and before receipt of the second message.

5. The method of claim 1, wherein receiving the first message comprises receiving a Session Initiation Protocol (SIP) message, and wherein local generation of the comfort indicator is triggered by the SIP message.

6. The method of claim 5, wherein causing local generation of the comfort indicator in response to the SIP message is in response to the SIP message that is unmodified from a standard SIP message.

7. The method of claim 5, wherein causing local generation of the comfort indicator in response to the SIP message is in response to a modified SIP message containing one or more fields not defined by SIP.

8. The method of claim 5, wherein receiving the SIP message comprises receiving a SIP Trying message, and wherein local generation of the comfort indicator is caused by the SIP Trying message.

9. The method of claim 5, wherein receiving the SIP message from the node comprises receiving the SIP message from a call control function module.

10. The method of claim 9, wherein receiving the SIP message from the call control function module comprises receiving the SIP message from the call control function module associated with the destination device.

11. The method of claim 5, wherein receiving the SIP message comprises receiving a SIP Progress message, and wherein local generation of the comfort indicator is caused by the SIP Progress message without establishing any bearer path over the IP network.

12. The method of claim 1, further comprising:
    after causing local generation of the comfort indicator, sending an update message indicating that local resources have been reserved by the originating terminal.

13. The method of claim 1, wherein the originating terminal is a mobile terminal, and wherein receiving the first message from the node is performed over a packet-switched wireless network.

14. A terminal comprising:
    an output device configured to output a comfort indicator; and a control module configured to:
        send a call request to establish a telephony session over an Internet Protocol (IP) network between the terminal and a destination device;
        receive a first message responsive to the call request from a node connected to the IP network; and in response to receiving the message, generating the comfort indicator by the output device without establishing any bearer path over the IP network, wherein the comfort indicator is different from a ringback indicator that the destination device is being alerted.

15. The terminal of claim 14, wherein the comfort indicator comprises one of an audio indicator and a visual indicator.

16. The terminal of claim 14, wherein the first message comprises a Session Initiation Protocol (SIP) message, the comfort indicator being generated in response to the SIP message.

17. The terminal of claim 14, the control module further configured to:
receive a second message indicating that an alert is being performed at the destination device;
generate the ringback indicator in response to the second message, wherein the comfort indicator is presented by the output device in an interval after sending the call request and before generating the ringback indicator.

18. An article comprising at least one non-transitory computer-readable storage medium containing instructions that when executed cause a device to:
send a call request to establish a telephony session over an Internet Protocol (IP) network between an originating terminal and a destination device;
receive a first message responsive to the call request from a node connected to the IP network; and
in response to receiving the first message, cause local generation of a comfort indicator at the originating terminal without establishing any media path over the IP network to the originating terminal, and wherein the comfort indicator is different from a ringback indicator that indicates that the destination device is being alerted.

19. The article of claim 18, wherein the instructions when executed cause the device to further:
receive a second message indicating that an alert is being performed at the destination device;
generate the ringback indicator in response to the second message, wherein the comfort indicator is presented by the output device in an interval after sending the call request and before generating the ringback indicator.

* * * * *